Patented Nov. 21, 1933

1,935,964

UNITED STATES PATENT OFFICE 1,935,964

PROCESS FOR PURIFICATION OF POLLUTED WATER

Oliver M. Urbain, Columbus, Ohio, assignor to Charles H. Lewis, Harpster, Ohio

No Drawing. Application April 19, 1933
Serial No. 666,934

8 Claims. (Cl. 210—2)

This invention relates to a process for water purification.

Heretofore much work has been done in the field of removing suspended and colloidal matter from polluted waters. Some attention has been devoted to the elimination of oxygen consuming organic compounds present in true solution in the waste waters. But, for the most part, processes relating to the latter field have been limited in character and uneconomical in practice.

The present invention is concerned primarily with the provision of an economical and practical process for the elimination of the oxygen consuming compounds which are present in organic waste waters in a state of true solution.

The oxygen consuming compounds which are present in a state of true solution in waste waters may be properly classified in six major groups. It is the purpose of the present invention to provide a process for the complete elimination of all of the organic compounds falling in these groups. The removal of such compounds by the present invention is effected by stoichiometric reactions.

The six groups of oxygen consuming organic compounds present in waste waters in true solution are as follows:—

Group 1.—Organic acids, R.COOH in which R equals any hydrocarbon radical, substituted or unsubstituted, or hydrogen.

Group 2.—Mercaptans, R.SH, in which R equals any hydrocarbon radical either substituted or unsubstituted.

Group 3.—Alcohols, R.OH, in which R equals any hydrocarbon radical either substituted or unsubstituted.

Group 4.—Amines, R.NH, in which R equals any hydrocarbon radical either substituted or unsubstituted.

Group 5.—Aldehydes, R.CHO, in which R equals hydrogen or any hydrocarbon radical either substituted or unsubstituted.

Group 6.—Ketones, R.CO.R, in which R equals any hydrocarbon radical either substituted or unsubstituted.

The merit and simplicity of the process resides in the fact that it is only necessary to incorporate two extraneous reagents into the waste water in order to effect the elimination of all polluting materials of the above six groups.

After extensive experimentation I have discovered that it is possible to effect a quantitive reaction between carboxylic acids of group 1 above and the (thionylamino) acyl halides. The reaction products are (acylamino) acid halides and $SO_2$. The reaction product (acylamino) acid halide will react quantitively with the alcohols, the mercaptans and the amines.

The first reaction, namely, that between the carboxylic acid and the (thionylamino) acyl halide occurs with the solution at a pH at or below 7. The subsequent reactions affecting the alcohols, mercaptans and amines only occur when the solution has a pH of 8 or above, preferably around pH 9. Therefore, after the first reaction I add sodium hydroxide, NaOH, to raise the pH of the solution. The NaOH reacts with the $SO_2$ which, it will be observed, was a product of the first reaction, forming sodium bisulfite $NaHSO_3$. The sodium bisulfite in turn reacts quantitively with the ketones and aldehydes. Thus, by the addition of the first reagent, i. e., (thionylamino) acyl halide and the second reaction, sodium hydroxide, it is possible to effect a succession of reactions, producing reaction products which act to eliminate all of the six major groups of the organic compounds listed above.

If carboxylic acids are present in an amount adequate to form with the (thionylamino) acyl halide employed sufficient (acylamino) acid halide to react with all of the alcohols, mercaptans and amines present, then further addition of carboxylic acid is unnecessary. If, however, insufficient carboxylic acid is present in the waste, it is necessary to make up the deficiency by the addition of a cheap carboxylic acid such as acetic acid. Likewise, if the basic reaction does not supply sufficient sulfur dioxide to form sufficient $NaHSO_3$ to react with all of the aldehydes and ketones present, it may be necessary to make up the deficiency by the addition of more $SO_2$ or more $NaHSO_3$.

In each instance the reagents are employed in gram molecular equivalents. The basic reaction, (thionylamino) acyl halide and carboxylic acid, takes place at pH's below pH 7.0. The following reactions, five in number, take place at pH's above pH 7.0, preferably at pH 8.0 to 10.0, in a medium alkaline with caustic soda. Very little caustic soda is required as it ionizes very strongly.

The general formulæ for the (thionylamino) acyl halides is as follows:—

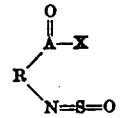

R equals any hydrocarbon radical having a valence of 2 or more.

A equals carbon atom, sulfur atom, phosphorus atom, or arsenic atom.

X equals any halide atom.
Oxygen is attached to A in one or more atoms.
The general reactions for the six groups above listed are as follows:—

1. (thionylamino) acyl halide + carboxylic acid = (acylamino) acid halide + sulfur dioxide 2. (acylamino) acid halide + mercaptan = ester of an (acylamino) thiol acid + halogen acid 3. (acylamino) acid halide + alcohol = ester of an (acylamino) acid + halogen acid 4. (acylamino) acid halide + amine = substituted (acylamino) acid amide + halogen acid In this equation R''' equals hydrogen or any hydrocarbon radical.

The reaction of the SO₂ formed in the first reaction above and the NaOH added forms sodium bisulfite NaHSO₃ which enters into reaction with the aldehydes and ketones as follows:—

5. NaHSO₃ + aldehyde = sodium (hydroxysulfonate)

6. NaHSO₃ + ketone = sodium (hydroxysulfonate)

As stated, the first reaction takes place at all pH's below pH 7.0, and the remaining reactions take place at all pH's above pH 7.0, preferably at pH 8.0 to pH 10.0.

Following are given exemplary reactions using specific reagents:—

1. o-thionylaminobenzoyl chloride + acetic acid = o-acetamidobenzoyl chloride + SO₂

2. o-acetamidobenzoyl chloride + ethyl mercaptan = ethyl o-acetamidothiolbenzoate + hydrochloric acid 3. o-acetamidobenzoyl chloride + ethyl alcohol = ethyl o-acetamidobenzoate + hydrochloric acid 4. o-acetamidobenzoyl chloride + methyl amine = o-acetamido-N-methyl-benzamide + hydrochloric acid 5. $SO_2$ + NaOH = $NaHSO_3$
   sulfur dioxide + sodium hydroxide = sodium bisulfite 6. $NaHSO_3 + CH_3.CH_2.CH_2.CHO = CH_3.CH_2.CH_2.CH-SO_3Na$
                                                              |
                                                              OH
   sodium bisulfite + butraldehyde = butraldehyde sodium bisulfite 7. $NaHSO_3 + CH_3.CO.CH_2.CH=CH_2 = CH_3-C-CH_2-CH_3$
                                         |  |
                                         OH SO₃Na
   sodium bisulfite + 2-butanone = 2 butanone sodium bisulfite In carrying out the process one must first determine the total amounts of the following groups of compounds present, carboxylic acids, alcohols, amines, mercaptans, aldehydes, ketones. The quantity of (acylamino) acid halide required to react with the total amounts of alcohols, amines and mercaptans present is then computed. From this figure one can compute according to the first reaction the amount of (thionylamino) acyl halide required to produce the quantity of (acylamino) acid halide computed above. This quantity of (thionylamino) acyl halide is added to the waste and it is agitated for about five minutes. If there is present insufficient carboxylic acids to react with all the (thionylamino) acyl halide employed the deficiency is made up by adding the required amount of a cheap carboxylic acid, such as acetic acid. During the above stage of the process the pH is maintained below pH 7.0. After the agitation period is complete and while agitation continues, I add sodium hydroxide in an amount sufficient to react with all of the sulfur dioxide released in the first reaction and sufficient excess to raise the pH to pH above 8. The agitation is continued for about 8 minutes more after which the liquid is passed into sedimentation basins. A conventional coagulant may be added just before passing the liquid into the sedimentation basins if desired.

Having thus described my invention, what I claim is:—

1. A process for eliminating the oxygen consuming organic compounds present in true solution in organic waste waters comprising treating the waste water containing such compounds with an (thionylamino) acyl halide.

2. A process for eliminating oxygen consuming organic compounds including alcohols, amines and mercaptans from waste water in which such compounds are present in true solution comprising reacting with such compounds an (acylamino) acid halide.

3. A process for eliminating oxygen consuming organic compounds including alcohols, amines and mercaptans from waste water in which such compounds are present in true solution comprising reacting with such compounds an (acylamino) acid halide formed in situ.

4. A process for eliminating oxygen consuming organic compounds including alcohols, amines and mercaptans from waste water in which such compounds are present in true solution comprising reacting with such compounds an (acylamino) acid halide formed in situ by reaction of a carboxylic acid and an (thionylamino) acyl halide.

5. A process for eliminating oxygen consuming organic compounds including carboxylic acids, alcohols, amines and mercaptans from waste water in which said compounds are present in true solution comprising first reacting a (thionylamino) acyl halide with carboxylic acid in an amount adequate to form (acylamino) acid halide in the solution sufficient to react with all the alcohols, amines and mercaptans present in the waste water, effecting the first reaction with the pH of the solution at or below 7 and effecting the subsequent reactions with the solution at a pH above 8.

6. A process for eliminating oxygen consuming organic compounds, present in true solution in organic waste waters, including carboxylic acids, alcohols, amines, mercaptans, aldehydes and ketones, comprising first reacting an (thionylamino) acyl halide with carboxylic acid in the solution in sufficient amount to form in the solution (acylamino) acid halide adequate in amount to react with all alcohols, mercaptans and amines in the liquid, effecting the first reaction with the solution at a pH of approximately 7 and effecting the subsequent reactions with the solution at a pH above 8, maintaining the solution at a pH above 8 by adding thereto sodium hydroxide and utilizing the sodium bisulfite formed in the solution by reaction of the NaOH and the $SO_2$ released by said first reaction to react with the aldehydes and ketones in the waste water.

7. A process for eliminating oxygen consuming organic compounds including organic acids, mercaptans, alcohols and amines from waste waters in which said compounds are present in true solution comprising introducing to the waste water a reagent capable of reacting with at least one of said compounds to produce a reaction product capable of reaction with each of the remaining compounds.

8. A process for eliminating by stoichiometric reaction oxygen consuming compounds including organic acids, mercaptans, alcohols, amines, aldehydes and ketones from waste water in which said compounds are present in true solution comprising introducing a reagent capable of reacting with the organic acids while the solution is maintained at a pH below 7 to form reaction products in the solution available as reagents for effecting reaction with the remaining oxygen consuming compounds when the pH of the solution is raised above pH 8 by addition of NaOH thereto.

OLIVER M. URBAIN.